United States Patent [19]

Moody

[11] 4,119,224
[45] Oct. 10, 1978

[54] VEHICLE OF ADJUSTABLE WIDTH
[76] Inventor: David Moody, Box 4308, Waco, Tex. 76705
[21] Appl. No.: 837,185
[22] Filed: Sep. 28, 1977

Related U.S. Application Data

[63] Continuation of Ser. No. 657,586, Feb. 12, 1976, abandoned.
[51] Int. Cl.$^2$ .............................................. B60P 3/06
[52] U.S. Cl. ...................................... 214/85; 280/656
[58] Field of Search ................... 214/85, 85.1; 280/656; 296/26

[56] References Cited

U.S. PATENT DOCUMENTS

| | | | |
|---|---|---|---|
| 2,705,081 | 3/1955 | Jacobs | 214/85 |
| 3,330,574 | 7/1967 | Kulyk | 280/656 |
| 3,913,934 | 10/1975 | Koehn et al. | 280/656 |

Primary Examiner—Robert G. Sheridan
Attorney, Agent, or Firm—Schuyler, Birch, Swindler, McKie & Beckett

[57] ABSTRACT

A trailer for transporting large machinery such as farm combines and the like. The trailer comprises a main or center portion flanked laterally by side portions, each side portion comprising a plurality of outwardly telescoping sections which form runways to receive the wheels of the machinery. The trailer wheels and towing gear are attached to the main portion. The side sections are extendable to accommodate equipment having a wide wheel-span. Each of the three side sections on each side, can be separately extended or retracted by a single person. An alignment system is provided to facilitate alignment of the three sections. A chain limits the outward extension of the side sections. Locking pins hold the side sections in their inner positions.

18 Claims, 9 Drawing Figures

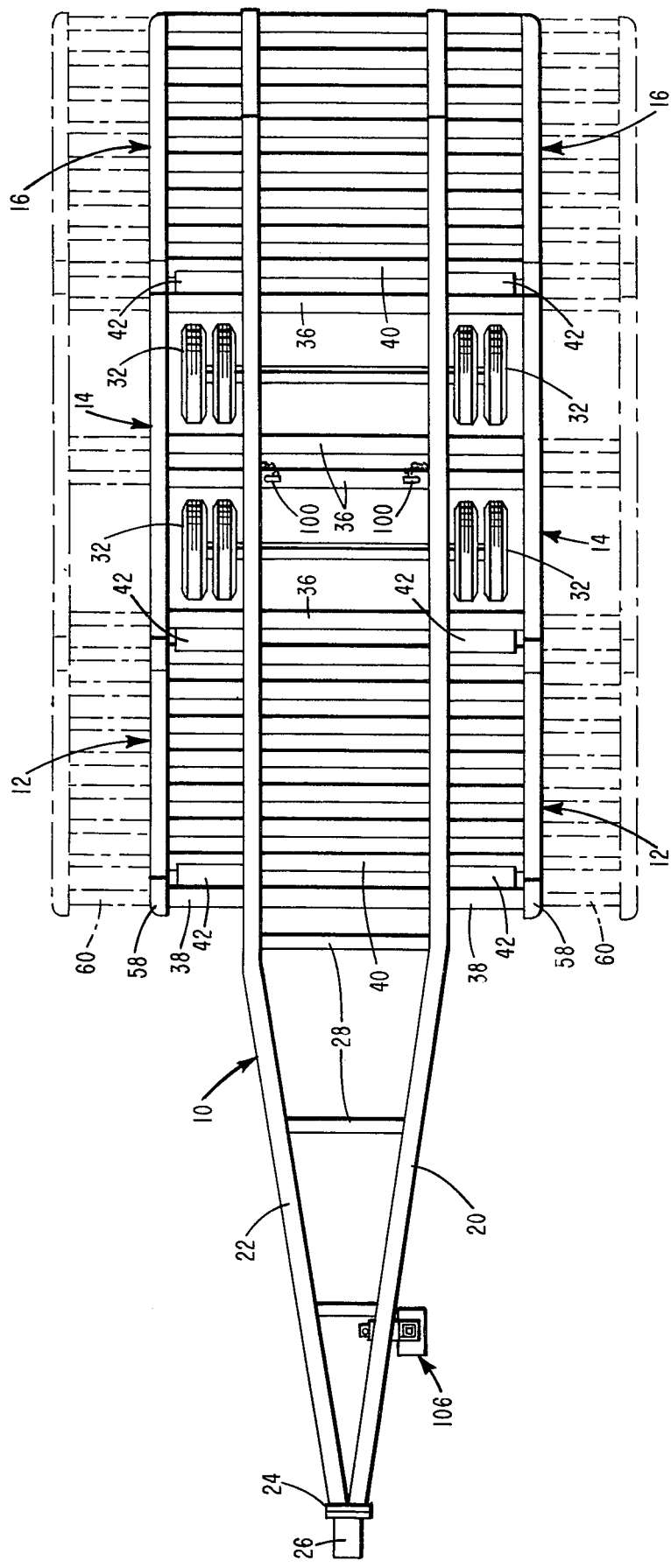

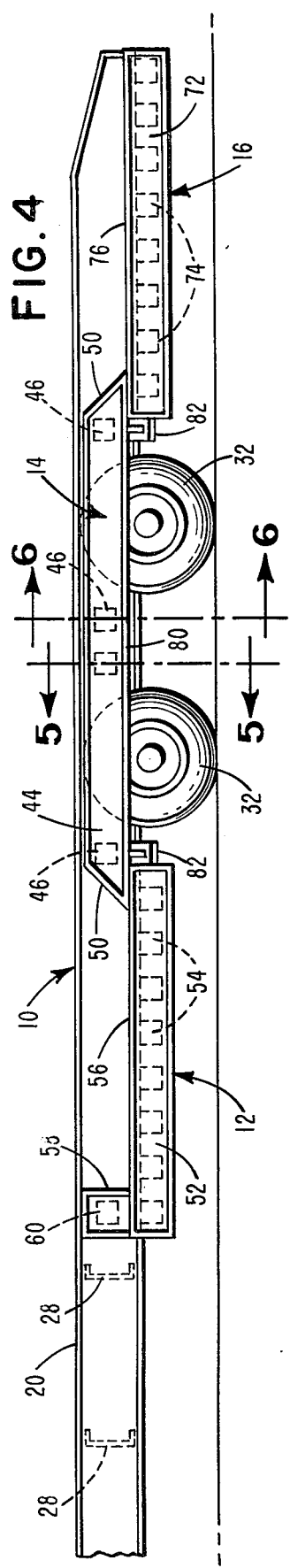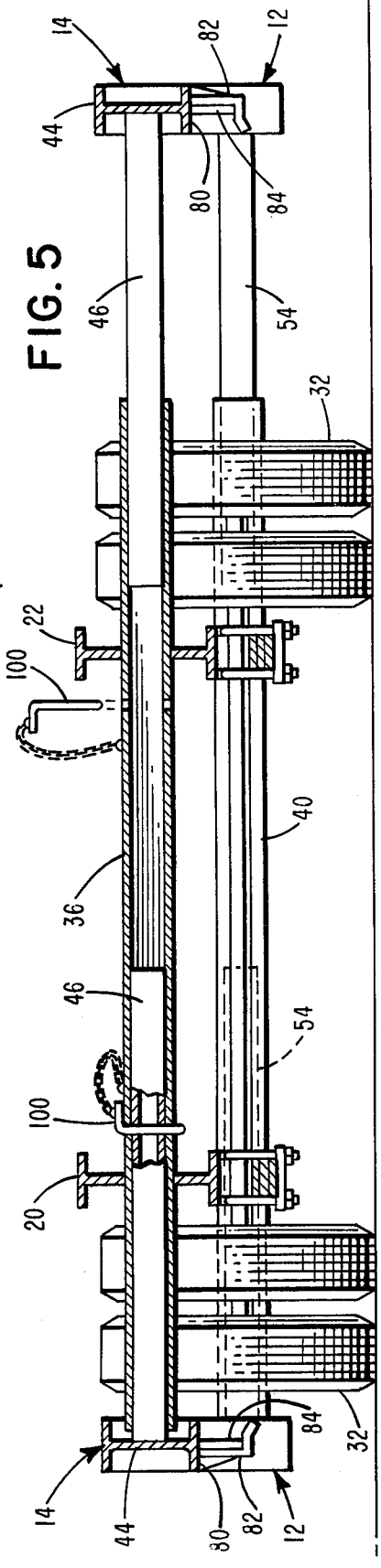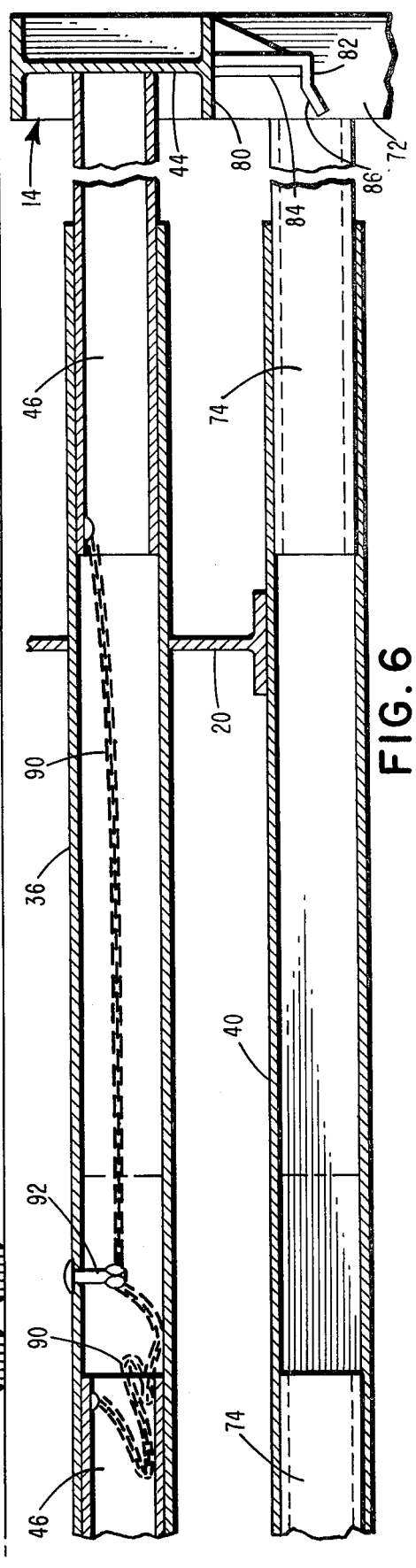

VEHICLE OF ADJUSTABLE WIDTH

This is a continuation of application Ser. No. 657,586, filed Feb. 12, 1976, now abandoned.

BACKGROUND OF THE INVENTION

This invention is directed to a vehicle for transporting large machines such as combines and other large equipment. The inventive concepts are usable in conjunction with self-propelled vehicles or trailers. Although many vehicles have been constructed for transporting such equipment, there have been many problems and disadvantages with those of the prior art.

The trend in farm machinery today is toward more efficient machinery, and this generally means larger machinery. This trend is exemplified by the developments in the field of combines used by farmers to harvest crops. Combines have grown in width beyond the standard 8 foot width allowed for vehicles on public highways during all but certain hours of each day. These over width machines also have wheels that are spaced apart more than 8 feet. The machines are usually transported by trailer, and thus the trailers are also wider than the acceptable width. In most cases, over-wide vehicles can move only during certain hours of each day, and require special permits and escorts even under these circumstances.

When an over width machine is being transported, there is no way to avoid these restrictions. However, in many cases it is advantageous to move the transport vehicles when empty, and presently such movement is subject to the same restrictions as when loaded, because of the over-wide width, loaded or empty. Perhaps one-half of all traveling with these transport vehicles is with them empty, or carrying loads less than 8 feet wide.

In the prior art, transport vehicles such as trailers are built having a width wide enough for the largest machines that they might haul. Thus, they are subject to the same restrictions as the equipment which might be transported upon them.

SUMMARY OF THE INVENTION

It is an object of this invention to provide a new and novel vehicle for carrying wide machinery.

Another object of this invention is to provide such a vehicle that is of variable width.

Still another object of this invention is to provide such a vehicle having a plurality of sections movable between retracted and extended width positions, and means to assure alignment of these sections.

Another object of this invention is to provide such a vehicle whose width can be varied easily by the efforts of only one person.

A vehicle constructed in accordance with the teachings of this invention has a center portion and a pair of side portions flanking the center portion. The running gear (and trailer towing gear) are advantageously attached to the center portion, although this could be altered. The center portion comprises a frame and a plurality of side section support members attached to the frame. Each side section support member is adapted to interact in telescoping relationship with elements of the side sections. Preferably, these side section support members are hollow tubular members. There are sufficient number of side section support members to form runways to receive the wheels of the machinery being carried.

Each side portion comprises a plurality of side sections, arranged along the length of the trailer. Each side section has an outer rail and a plurality of telescoping members that interact with the side section support members on the main frame. The side sections are movable between an inner position, fully retracted to a width preferably less than 8 feet, and a plurality of outer positions spaced outwardly therefrom, the outermost positions providing, for example, a total width of 12 feet, although greater widths can be obtained. The telescoping members form the runways for receiving the wheels of the machine being transported, and must extend sufficiently inward in engagement with the side section support members to be able to withstand the cantilevered load placed upon them by the machinery wheels. The forewardmost side section support member and its corresponding telescoping member are raised with respect to the rest to act as a forward abutment for the machinery wheels. Others can be raised also, to provide a cradle against movement for one or more of the machinery wheels.

Each side section is of such size and weight as to be movable by a single person. In order to insure that the various side sections are easily aligned longitudinally in a particular position, the middle section on each side is provided with a stop means, which is engaged by the flanking front and rear side sections, to halt the outward movement thereof at the same lateral position as the middle side section. A pin through the telescoping members of the middle side section holds all side sections in their innermost position. In their intermediate positions, the weight of the load holds the sections from movement inwardly or outwardly, although locking means could be provided. A means for limiting the amount of full extension is provided for at least the middle side section, and can be a tether or the like attached on the one hand to the center portion of the trailer and on the other hand to the middle side section.

The telescoping members can be of rectangular or circular section, or other tubing or sections that will so telescope together. The center portion of the vehicle advantageously includes heavy longitudinal frame members such as I-beams. The vehicle wheels are of such width as to allow highway access at all times, so the trailer is not restricted in use when not extended. Drive-on ramps are provided at the rear of the trailer, and are adjustable insofar as lateral spacing is concerned, to receive machinery wheels of various spacings.

BRIEF DESCRIPTION OF THE DRAWINGS

FIG. 3 is a top plan view of the trailer of FIG. 1.

FIG. 4 is a side elevational view of the trailer of FIG. 1.

FIG. 5 is a view taken along line 5—5 of FIG. 4.

FIG. 6 is a view taken along line 6—6 of FIG. 4.

DESCRIPTION OF THE PREFERRED EMBODIMENT

Figure 1:
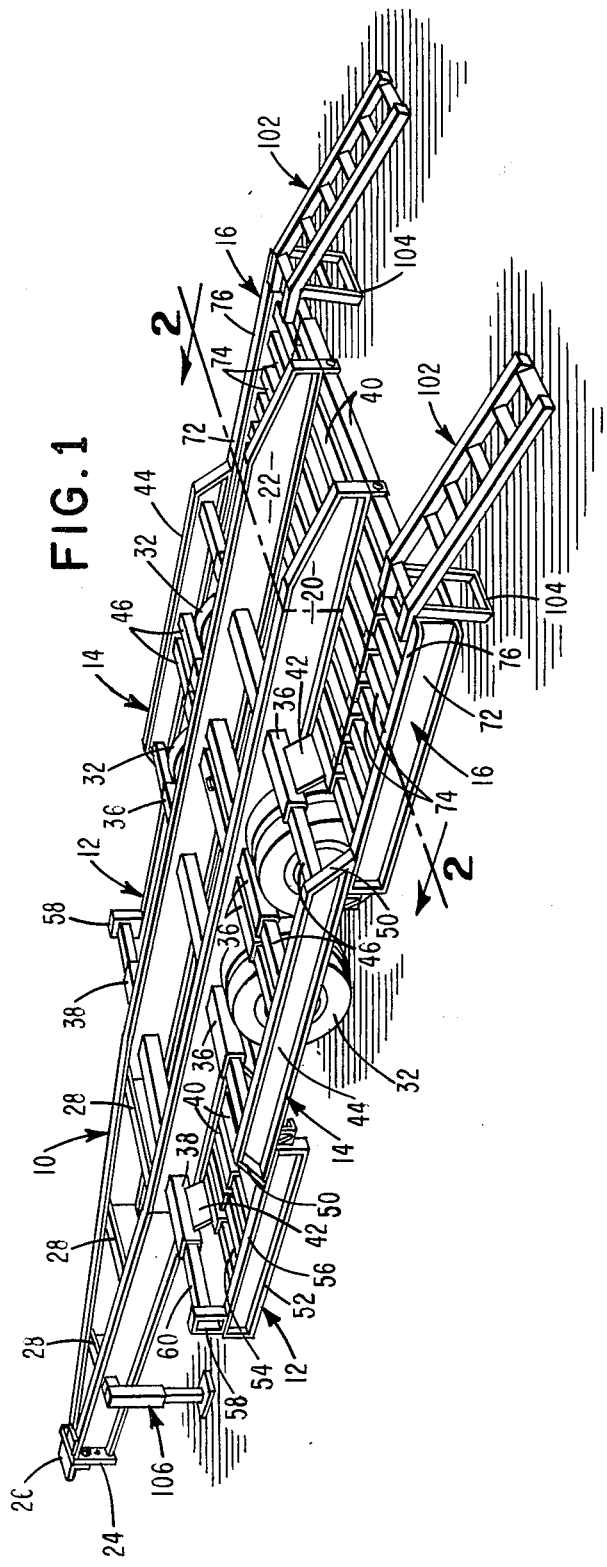
FIG. 1 is a perspective view of a trailer constructed in accordance with the teachings of the invention, with the side frames in the extended position.

The following description is directed to a trailer constructed in accordance with the teachings of this invention. However, except for those elements peculiar to trailers alone, the description could also apply to a self-propelled vehicle.

A trailer constructed in accordance with this invention comprises a main portion flanked by a pair of extendable side portions. The main portion comprises basically a main frame 10, and each side portion a plurality of side sections 12, 14, and 16.

Main frame 10 comprises left frame member 20 and right frame member 22, which are of I-beam construction, disposed on either side of a trailer axis. At the front portion of the trailer, where they converge, they are attached together by a pad 24, upon which the towing gear 26 is mounted. A plurality of lateral cross braces 28 are attached between frame members 20 and 22 at the front portion of the trailer. Four sets of dual wheels 32 are mounted on axles attached to the underside of frame members 20 and 22. The maximum distance between the outer surfaces of the wheels (or tires) is less than 8 feet by a sufficient margin to allow the maximum dimension in width of the entire trailer to be 8 feet or less in the retracted position.

Figure 7:
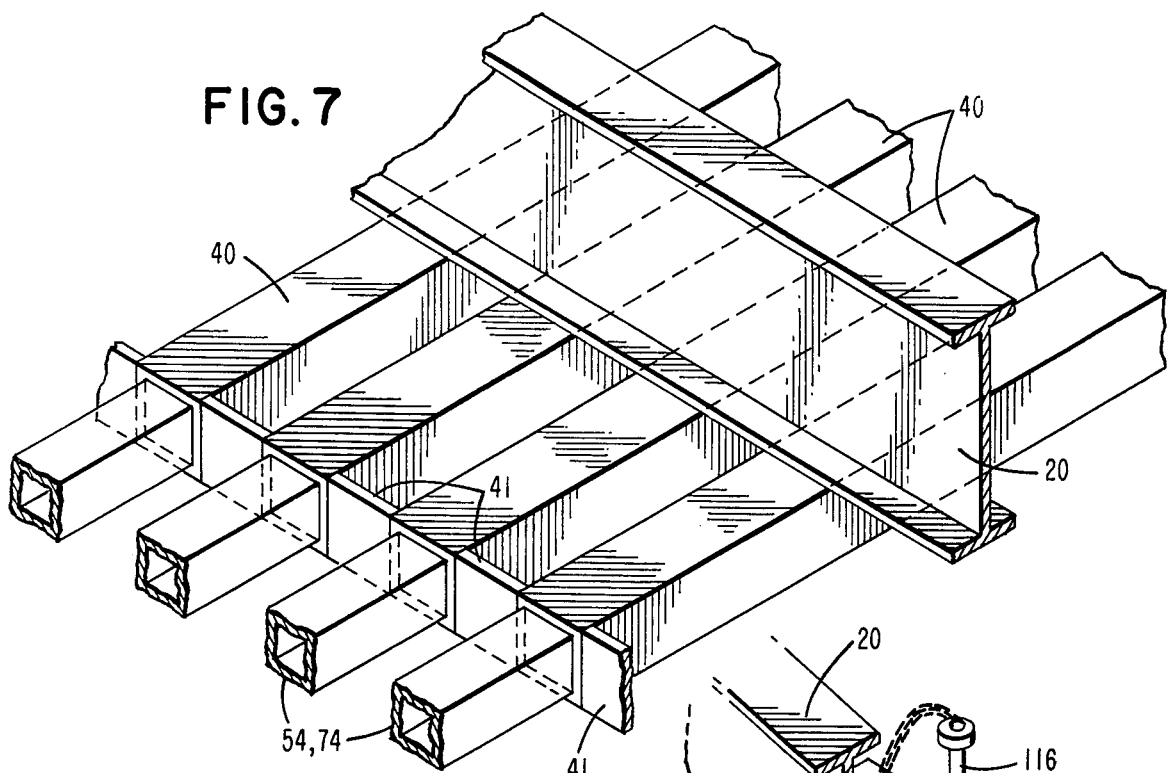
FIG. 7 is an enlarged perspective view showing the relationship between side frame and main frame.

Four square tube side support members 36 and a fifth such member 38 extend laterally across the trailer, passing through and welded to frame members 20 and 22. A plurality of square tube runway members 40 are attached to the undersides of main frame members 20 and 22 and extend laterally across the trailer. All these members support the side frames, while also providing cross bracing between the main frame members. Also, the outer ends of members 40 are joined by plates 41 welded thereto (FIG. 7) for reinforcement. A plurality of panels 42 are attached between some of the front and rear main side support members and the adjacent main runway members.

Middle side frame 14 comprises an outside rail 44, of I-beam construction, and a plurality of middle telescoping members 46 of square tube construction attached to the inner surface of outside rail 44 and that closely fit inside main side support members 38, and are slidable therein. The front and rear edges 50 of outside rail 44 are inclined to facilitate movement of the wheels of the machinery being carrier over them during loading and unloading. Panels 42 also assist the machinery wheels in moving over members 36 and 46 during loading and unloading. The upper surfaces of members 36 and 46 are approximately the same height as the uppermost surfaces of wheels 32.

Front side frame 12 comprises an outside rail 52 of I-beam construction, to which are attached a plurality of telescoping members 54 of square tube construction which fit closely inside of runway members 40, and are slidable therein. The upper surface 56 of outside rail 52 is positioned closely beneath the lower surface of outside rail 44. Attached to upper surface 56 is an extension 58, to which is attached a telescoping member 60, which fits closely within side support member 38. In addition to supporting side frame 12, members 38 and 60 halt the forward movement of the machine wheels, as do the rearmost members 36 and 46. The forward wheel of the machinery is also cradled by the forwardmost members 36 and 46, to prevent rearward movement.

Rear side frame 16 comprises an outside rail 72, to which are attached a plurality of telescoping members 74, which fit closely inside runway members 40, and are slidable therein. The upper surface 76 of outside rail 72 fits closely beneath the lower surface of outside rail 44.

Figure 2:
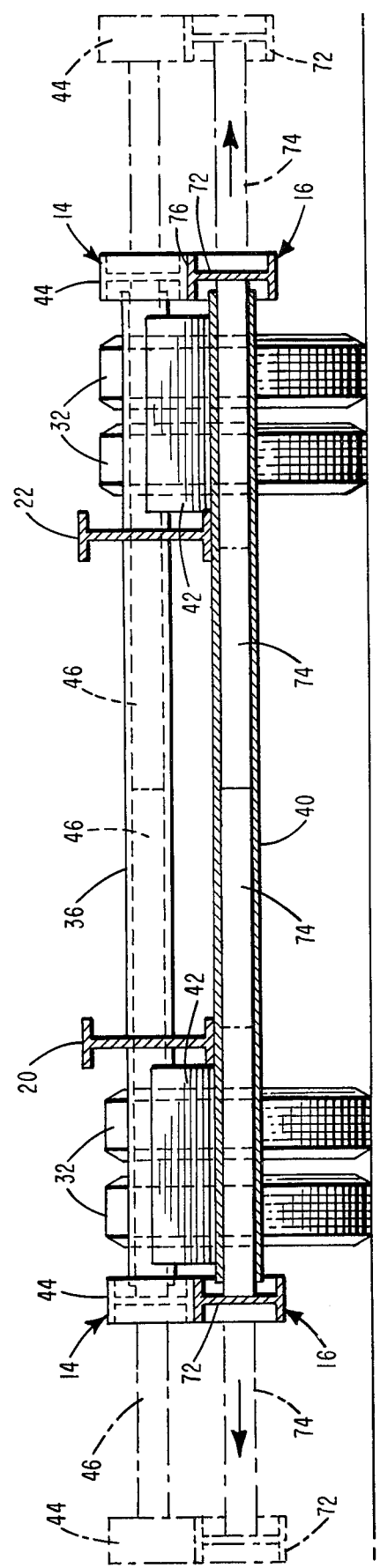
FIG. 2 is a view taken along line 2—2 of FIG. 1, showing the side frames in the retracted position in solid lines and in the extended position in broken lines.

Runway members 40 and main support members 36 and 38 have a total width somewhat less than 8 feet, so that the maximum width between the outside rails of the side sections in the retracted position is no more than 8 feet. The length of telescoping members 46, 54, 60 and 74 is maximized, to allow the side frames to be extended outwardly as far as possible, and to insure adequate overlap with the members into which they telescope, for maximum strength. Therefore, as shown in FIG. 2, the inner ends of telescoping members on opposite sides abut in the center when the side frames are fully retracted.

On the bottom surface 80 of outside rail 44 are a pair of L-shaped brackets 82. On the rear surface of outside rail 52 and on the front surface of outside rail 72 are a shoulder 84, aligned with brackets 82. The interaction of brackets 82 with shoulders 84 prevents side frames 12 and 16 from ever being positioned laterally outwardly of side frame 14. As inclined guide surface 86 on bracket 82 assists in the engagement of the two elements. Outward movement of middle side frame 14 is limited by the extension of a chain 90 (FIG. 6), which is attached to a pin 92 welded onto the inside of one of the main side frame support members 36 at the center thereof, and to the inside of the corresponding telescoping member 46. A pin 100 (FIG. 5) through openings in the main support member 36 and corresponding telescoping member 46 locks side frame 14 in its innermost position.

A pair of loading ramps 102 are attachable to the rearmost runway member 40 and/or corresponding telescoping members 74. Ramp support legs 104 extend downwardly from ramps 102, to help support the rear portion of the trailer during loading and unloading.

A swivel jack stand 106 (FIG. 8) is located at the front of the trailer, to support the trailer when it is not attached to the towing vehicle. Stand 106 comprises a mounting bracket 108 attached to frame member 20. A square tube mounting arm 110 is configured to be slidable within bracket 108. Arm 110 has a first pair of holes 112 and in two opposite sides and a second pair of holes 114 in the other sides. Bracket 108 has a pin 116 attached thereto. A stand member 118 is attached perpendicularly to arm 110. A telescoping leg 120 slides inside stand member 118, and is equipped with height adjustment openings 122 through which a pin 124 can pass. A bearing plate 126 completes the mechanism.

Many of the advantages of the invention should become apparent from a consideration of structural features described above. Chief among these are the simplicity and strength of the structure, the low height of the runways, and the inherent cradling of the wheels of the machine being carried plus, of course the simplicity, ease of operation, and effectiveness of the width adjustability concept. Additional advantages are also seen from a consideration of the operation of the apparatus. In its retracted position, the outside rails side frames 12, 14 and 16, on both sides, are in abutting relationship with the outer ends of main side support members 36 and 38 and runway member 40. Pins 100 are in place through one of the telescoping members 40, thus holding middle side frames 14 against outward movement. Because of stops 82, the other side frames 12 and 16 are also held against outward movement.

To extend the side frame, pins 100 are removed, and middle side frame 14 is extended to the desired position, its outward movement being limited by chain 90. Then, side frames 12 and 16 are extended until shoulders 84 engage stops 82. If this is an intermediate position short of full extension, the weight of the machine being transported will prevent additional outward movement. However, additional preventing means, such as pins, could be used to define intermediate positions. With ramps 102 installed, the machine to be transported is driven, pushed, or pulled onto the trailer, until its forward wheel is cradled between the two forwardmost side support members 36 and 38.

When the machine being transported is removed, the trailer is returned to its narrow configuration by first pushing side frames 12 and 16 inwardly, followed by middle side frame 14. Pins 100 are then replaced.

Figure 8:
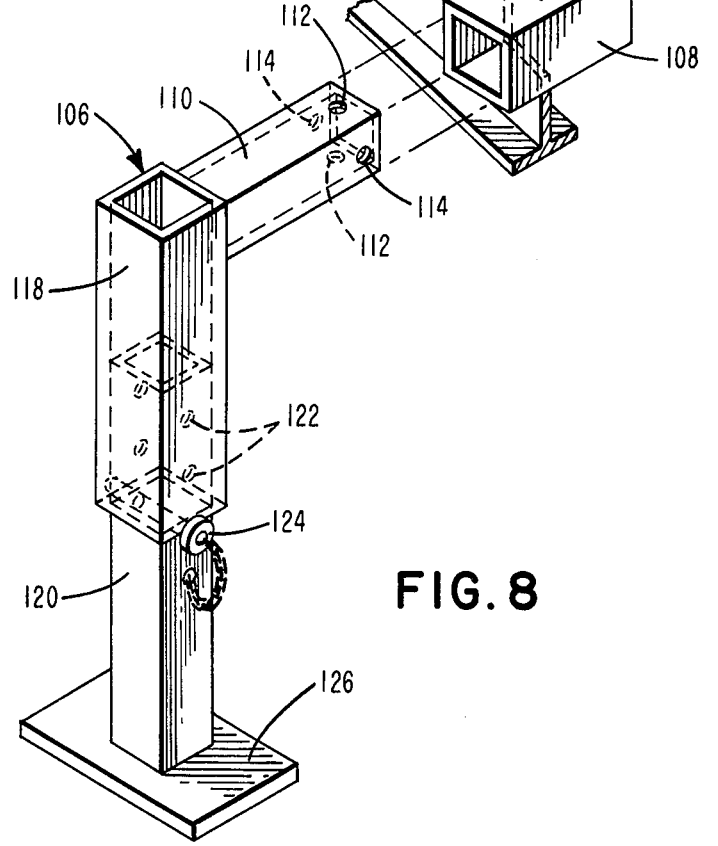
FIG. 8 is an enlarged perspective view of the front trailer support leg.
Figure 9:
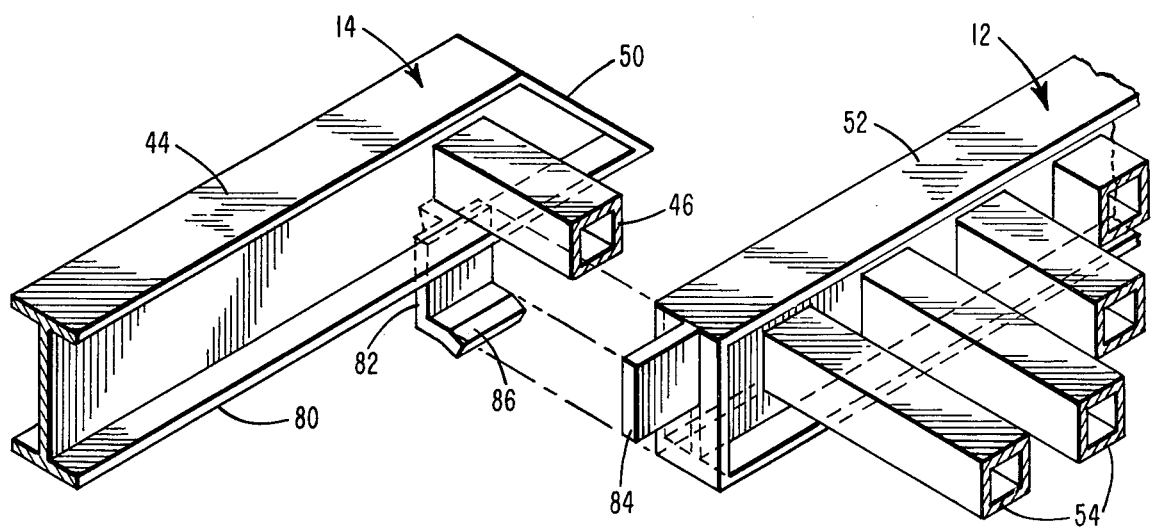
FIG. 9 is an enlarged perspective view of the side frame stop mechanism.

Jack stand 106 is shown in FIG. 8 in position to support the forward portion of the trailer. Arm 110 is insertable into bracket 108, and pin 116 slipped into place to hold it there. Leg 120 is extended to the desired position and held in place by pin 124. When the jack is not needed, arm 110 is removed from bracket 108 and then re-inserted after being rotated 90°, so that leg 120 is parallel to the ground. The jack is held in this position also by pin 116.

Variations and modifications from the above described preferred embodiment may become apparent to those skilled in the art, once having viewed this disclosure. However, the scope of the invention is not limited by this disclosure, but is governed by the breadth of the appended claims.

I claim:

1. In a vehicle for transporting wheeled machines and the like, the improvement comprising:
   a main frame disposed about a longitudinal axis with at least one vehicle supporting wheel rotataby mounted at each side of said main frame, said wheels having a fixed spacing relative to the frame axis to provide a vehicle width within the width allowed for vehicles on public highways,
   a plurality of side sections, at least two of said side sections being disposed on each side of said frame axis and each side section having support means for receiving and supporting the wheels of the wheeled machine while being transported, loaded or unloaded,
   means on said main frame supporting each of said side sections for movement substantially laterally between a retracted position and an extended position with the sections remaining parallel to said main frame during said movement,
   alignment means for facilitating alignment in said positions of all of said side sections on one side of said frame axis, said alignment means comprising stop means carried by a first one of said side sections on each side of said frame axis and stop engaging means carried by a second one of said side sections on each side of said frame axis and located adjacent to said first side section.

2. The combination of claim 1 wherein said stop means comprises a stop bracket at one end of said first one of said side sections and spaced laterally outwardly of said stop engaging means to prevent said stop engaging means from being moved laterally outwardly of said stop bracket.

3. The combination of claim 2 wherein a pair of stop brackets are attached at opposite longitudinal ends of a middle one of said side sections on each side of said frame axis, and are engaged by said stop engaging means attached to both of the adjacent of said side sections.

4. In a vehicle for transporting wheeled machines and the like, the improvement comprising:
   a main frame disposed about a longitudinal frame axis, and extending for substantially the entire length of said vehicle,
   a plurality of side sections, at least one of said side sections being disposed on each side of said frame axis, and
   means on said main frame supporting each of said side sections for movement substantially laterally of said frame axis between a retracted position and an extended position, said means supporting said side sections comprising for each of said side sections a plurality of side first support members attached to said main frame and extending generally perpendicular to said frame axis and wherein each of said side sections comprises a like plurality of second support members slidably engageable with said first support members and a side frame attached to said second support members and movable therewith, said side frame being substantially parallel to said frame axis.

5. The combination of claim 4 wherein said first support members each comprise an open-ended tube and said second support members are closely received in said tube in telescoping relationship therewith.

6. The combination of claim 5 wherein some of said first support members and corresponding of said second support members comprise a runway for receiving the wheels of the machinery to be transported, and other of said first and second support members are so located as to blockingly engage the wheels of the machinery being transported to prevent rolling movement thereof.

7. The combination of claim 4 wherein each of said first support members extends laterally across the vehicle such that said second support members on one side of said vehicle axis engage one end of said first support members and said second support members on the other side of said frame axis engage the other end of said first support members.

8. The combination of claim 7 wherein each of said first support members comprises a tube having two open ends, and each of said second support members is received in an open end of said tube in telescoping relationship thereto.

9. The combination of claim 8 further comprising a flexible tether connected on the one hand to said main frame and on the other hand to one of said second support members on the inside of its corresponding one of said tubular first support members to limit the outward extension of said second support member.

10. The combination of claim 8 further comprising side section alignment means mounted on at least one of said side sections on each side of said frame axis to facilitate alignment of said side sections.

11. The combination of claim 10 wherein said side section alignment means comprises a stop having an inward facing surface mounted on said side frame of one of said side sections and a stop engagement means on said side frame of an adjacent one of said side sections and engageable with said inward facing surface to prevent movement of said adjacent one of said side sections outwardly a greater distance than that of said one side section.

12. The combination of claim 11 wherein a pair of said stops are located on one of said side sections that is flanked by a pair of adjacent side sections, each of said adjacent side sections having a stop engagement means.

13. The combination of claim 8 wherein said first and second support members are tubes of rectangular cross-section and said main frame comprises a pair of spaced longitudinal frame members having a vertically oriented major cross-sectional axis.

14. The combination of claim 8 further comprising loading ramp means attachable to the last of said first and/or said second support members on each side of said frame axis to support the wheels of the machinery being transported during loading and unloading.

15. The combination of claim 4 wherein said wheels are interposed between said first support members adjacent to said main frame.

16. The combination of claim 15 wherein one said side section is aligned with said wheels, and said first and second support members associated with said one side section flank said wheels and are at substantially the same height as the uppermost surface of said wheels, and wherein said first and second support members supporting the others of said side sections are located vertically lower than the uppermost surfaces of said wheels, and are so spaced from one another axially as to define a runway for the wheels of the machinery being transported.

17. The combination of claim 16 comprising at least three of said side sections on each side of said frame axis, and wherein the middle one of said three side sections is aligned with said wheels.

18. The combination of claim 4 wherein portions of said side frames of two adjacent side sections overlap one another longitudinally, and the overlapping portion of one of said side frames is disposed above the overlapping portion of the other of said side frames substantially vertically aligned therewith.

* * * * *